Sept. 29, 1959 M. L. ANTHONY ET AL 2,906,612
CUTTING APPARATUS AND MANUFACTURE THEREOF
Filed Aug. 7, 1957 4 Sheets-Sheet 1
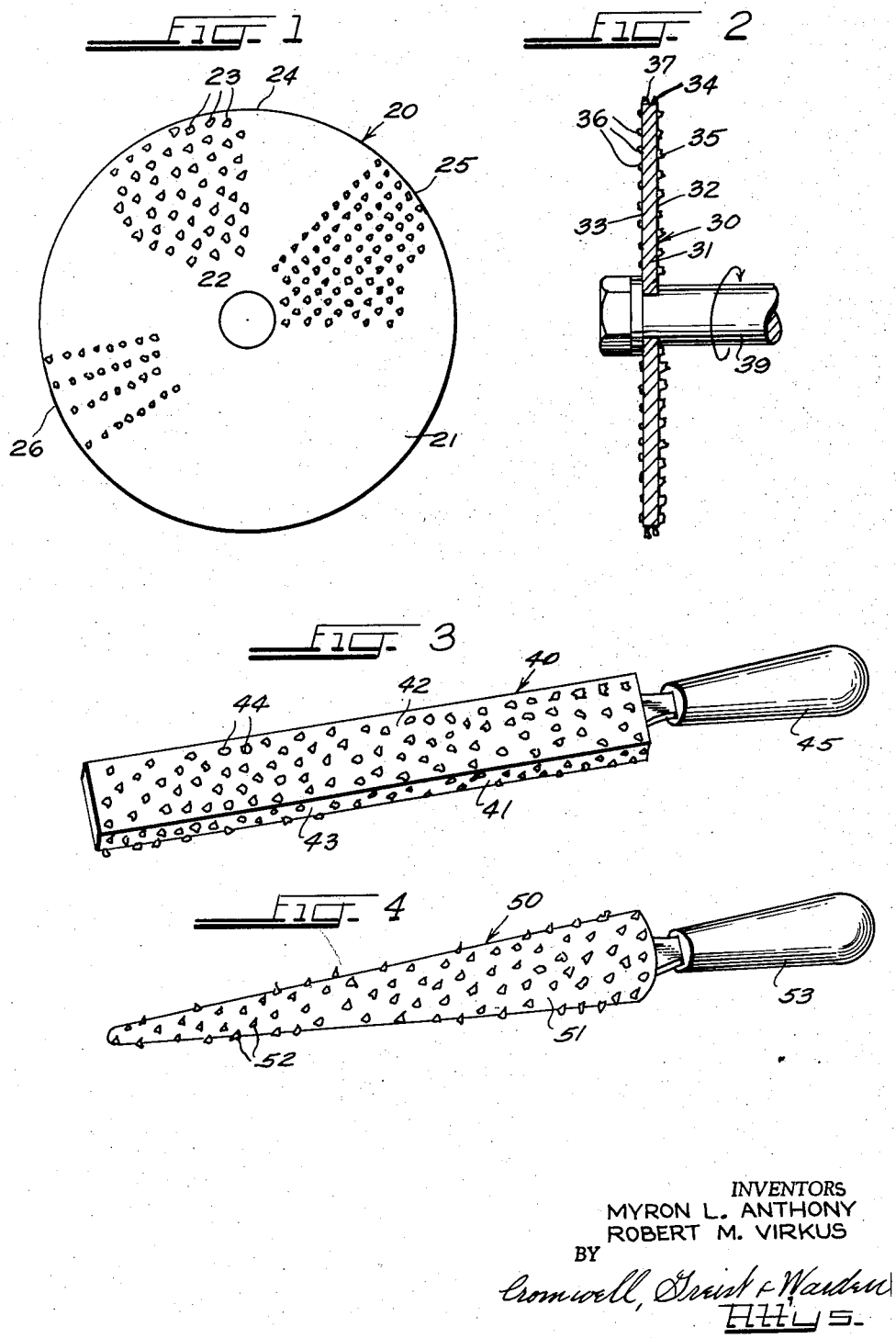
INVENTORS
MYRON L. ANTHONY
ROBERT M. VIRKUS
BY
Cromwell, Greist & Warden
ATTYS.

Sept. 29, 1959 M. L. ANTHONY ET AL 2,906,612
CUTTING APPARATUS AND MANUFACTURE THEREOF
Filed Aug. 7, 1957 4 Sheets-Sheet 2
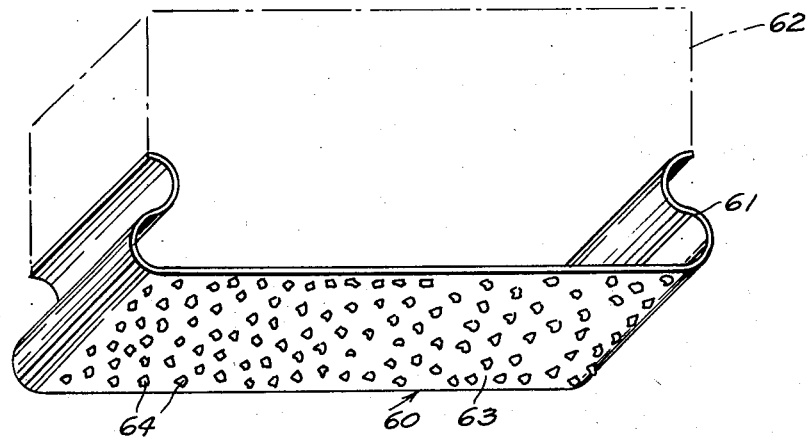
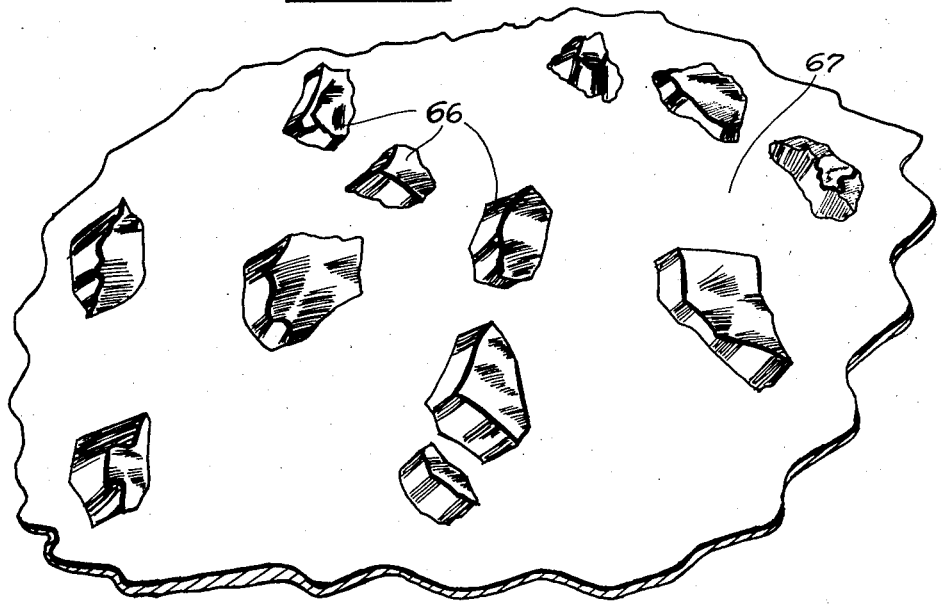
INVENTORS
MYRON L. ANTHONY
ROBERT M. VIRKUS
BY Sept. 29, 1959　　　M. L. ANTHONY ET AL　　　2,906,612
CUTTING APPARATUS AND MANUFACTURE THEREOF
Filed Aug. 7, 1957　　　　　　　　　　　　　　　4 Sheets-Sheet 3
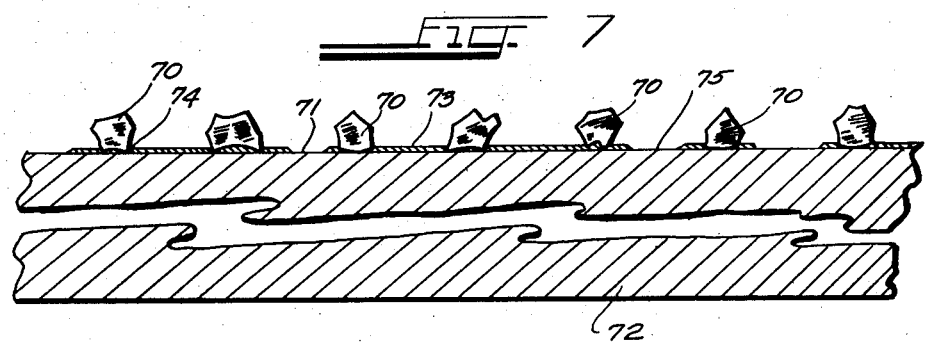
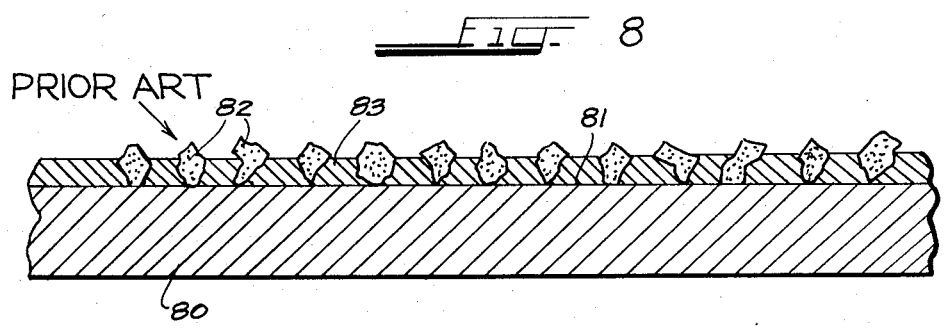
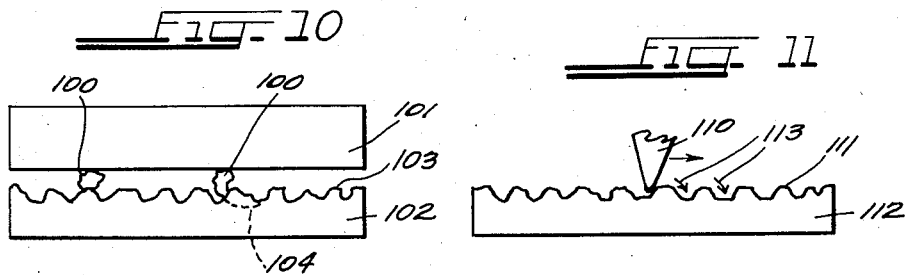
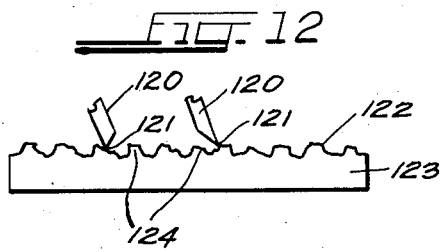
INVENTORS
MYRON L. ANTHONY
ROBERT M. VIRKUS
BY
Cromwell, Greist & Warden
ATTYS.

Sept. 29, 1959  M. L. ANTHONY ET AL  2,906,612
CUTTING APPARATUS AND MANUFACTURE THEREOF
Filed Aug. 7, 1957  4 Sheets-Sheet 4
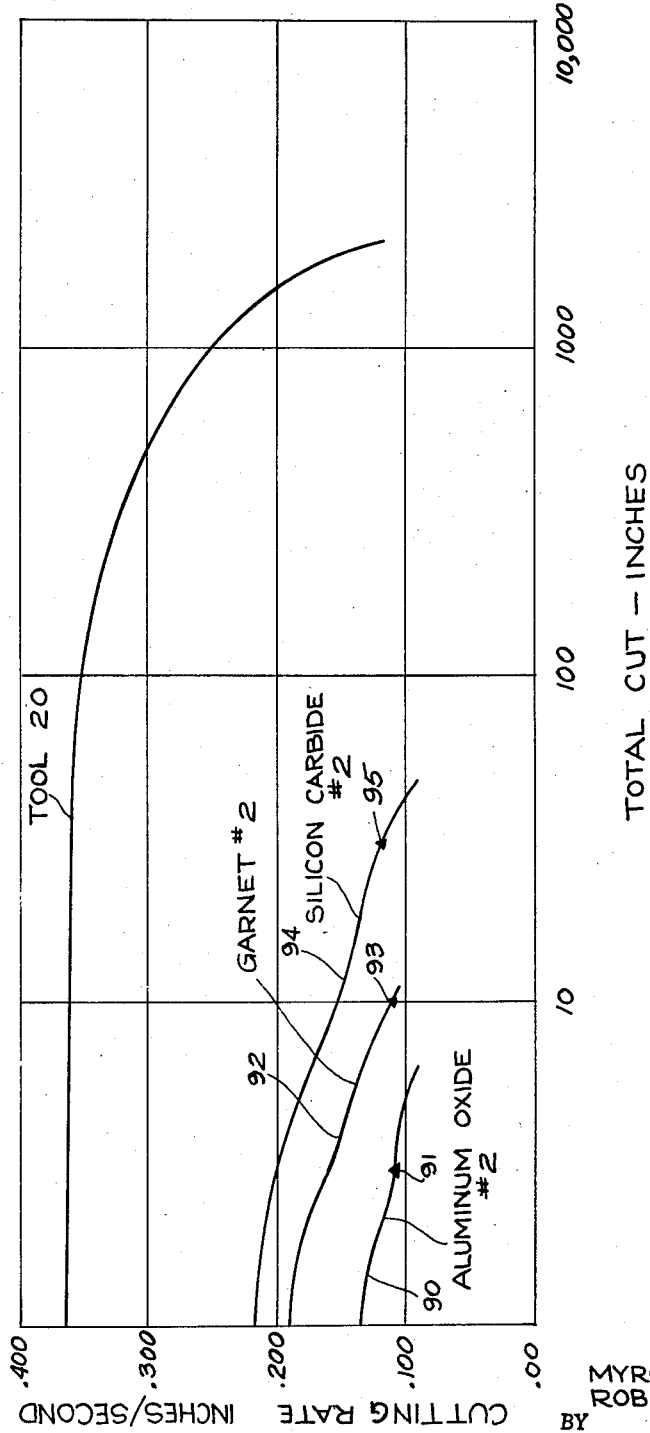
INVENTORS
MYRON L. ANTHONY
ROBERT M. VIRKUS
BY
Cromwell, Greist & Warden
ATT'YS.

United States Patent Office

2,906,612
Patented Sept. 29, 1959

2,906,612

CUTTING APPARATUS AND MANUFACTURE THEREOF

Myron L. Anthony, La Grange, and Robert M. Virkus, Western Springs, Ill., assignors to Skil Corporation, Chicago, Ill., a corporation of Delaware Application August 7, 1957, Serial No. 676,766

11 Claims. (Cl. 51—309)

This invention relates to a new and improved cutting tool and to a method of making a cutting tool. More particularly, the invention relates to a tool which, in its various embodiments, is suitable for sawing, slicing, surface finishing, and like operations as well as to a method of manufacturing tools of this nature.

In the woodworking, leatherworking, plastic working and other related arts, several distinct types of tools have been employed for severing the materials being worked and for surface finishing those materials. As a familiar example, wood is usually cut with a steel saw having a series of relatively sharp aligned teeth which effectively cut through the wood. Surface finishing, on the other hand, has almost universally been accomplished by tools which afford an abrasive action. These surface-finishing tools effectively grind away or score the surface of the material to achieve the desired finish. The present invention relates to tools which may be utilized in either a severing or a surface finishing operation but which in either instance effectively afford a cutting action with respect to the material being worked. The cutting action provided by tools constructed in accordance with the invention is substantially more efficient than the abrading or grinding effects produced by previously known surface smoothing devices, yet affords a finish which is equal in quality to that provided with previously known tools.

In virtually all woodworking, leatherworking, plastic working and related operations, the life of the tools employed constitutes an extremely important factor in determining the cost of the manufacturing or other process. The cutting implements previously known in the art have afforded reasonably satisfactory life, although they are in some instances subject to undue wear and require undesirably frequent replacement. This difficulty is much more prevalent in the surface finishing art. In this field, the most frequently employed tool or device comprises a comminuted abrading or scoring material distributed upon the surface of the tool and retained in place by glue or some other similar bonding agent. Typical examples of such grinding or scoring devices are conventional sandpaper, emery paper, garnet paper, aluminum oxide paper, and the like. Equivalent scoring or abrading tools are employed in machines such as rotary sanders and similar equipment. In all the devices of this kind, rapid deterioration of the abrading or scoring surface is a prevalent condition, resulting in substantial economic losses due to the necessity for replacing the scoring tools or at least the surface portions thereof. Consequently, even though the sandpaper and related articles are relatively inexpensive, they constitute a distinct economic disadvantage insofar as the overall processing is concerned. Moreover, many of these abrading and scoring articles are relatively low in efficiency, particularly when applied to the surface finishing of relatively tough or hard materials including hard woods and the harder and tougher plastics.

A primary object of the invention, therefore, is a new and improved cutting tool structure adapted to surface finishing operations or to severing operations, which effectively overcomes the above-noted disadvantages of previously known devices.

A more specific object of the invention is a new and improved cutting tool structure suitable for sawing, slicing, surface finishing, trimming, and like operations which affords a very much longer effective life than may be obtained with previously known tools.

A related object of the invention is a method of manufacturing a new and improved cutting tool having extremely long life and suitable for either severing or surface finishing operations.

A further object of the invention is a new and improved cutting tool of the kind described hereinabove which is relatively low in cost in relation to the service life and efficiency of operation afforded by the tool and a new and improved method of making such a cutting tool.

Another important object of the invention is a new and improved surface-finishing tool which affords very substantially improved efficiency in operation as compared with the grinding and abrasive devices commonly employed in the surface finishing of wood, leather, plastics, and like materials.

An additional object of the invention is a new and improved cutting tool which may be utilized for severing and surface finishing operations and which also may be adapted to the accomplishment of both such operations simultaneously.

Another object of the invention is a new and improved cutting tool which is effective and efficient in dissipating heat generated in a cutting operation, thereby permitting high speed operation of the tool.

A further object of the invention is a new and improved cutting tool adapted to the sawing and slicing of wood, plastics, leather and like materials which inherently minimizes the danger of injury to the user of the tool.

Other and further objects of the present invention will be apparent from the following description and claims and are illustrated in the accompanying drawings which, by way of illustration, show preferred embodiments of the present invention and the principles thereof and what is now considered to be the best mode for applying those principles. Other embodiments of the invention embodying the same or equivalent principles may be used and structural changes may be made as desired by those skilled in the art without departing from the present invention.

In the drawings:

Fig. 1 is an elevation view illustrating one form of a cutting tool constituting one embodiment of the invention;

Fig. 2 is a sectional view of a second embodiment of the invention;

Fig. 3 is a perspective view of another embodiment of the apparatus aspect of the invention;

Fig. 4 is a perspective view showing showing another cutting tool constructed in accordance with the invention;

Fig. 5 illustrates yet another physical embodiment of the invention;

Fig. 6 is a greatly enlarged plan view of the working surface of a cutting tool constructed in accordance with the invention;

Fig. 7 is a sectional view, greatly enlarged, of a cutting tool fabricated in accordance with the invention;

Fig. 8 is an enlarged sectional view, similar to Fig. 7, showing a particular form of a previously known surface finishing tool;

Fig. 9 is an explanatory diagram illustrating the operating characteristics of the invention in comparison with previously known devices;

Fig. 10 is a partly schematic illustration utilized to explain the operational characteristics of certain prior art devices;

Fig. 11 is a partly schematic view, similar to Fig. 10, of another type of prior art device; and Fig. 12 is a partly schematic illustration, similar to Figs. 10 and 11, which is utilized in explanation of certain operating characteristics of cutting tools constructed in accordance with the invention.

The tool 20 illustrated in Fig. 1 comprises a surface-finishing cutting tool constructed in accordance with the invention. The tool 20 is of disc-like configuration, having a relatively flat annular work surface 21 and being provided with a central aperture 22 to permit mounting of the tool on a shaft. A multiplicity of minute cutting elements 23 are distributed upon the work surface 21 of the cutting tool, the distribution pattern of the cutting elements being extremely open. Stated differently, the cutting elements 23 are relatively widely spaced and cover only a fractional portion of the work surface 21 of the tool. The distribution factor for the layer of cutting elements may be defined as the ratio of the work surface area covered by the cutting elements to the total effective work surface area of the tool; this distribution factor should be kept relatively low in order to afford an efficient cutting action, as described more fully hereinafter. Preferably, the distribution factor should be twenty percent or less, best results being derived with a distribution factor somewhat lower than ten percent.

The cutting elements 23 of the tool 20 do not comprise conventional abrading particles such as grains of aluminum oxide, garnet, sand, and the like which have heretofore been employed in surface-finishing discs of this kind. Rather, the cutting elements comprise fractured or fragmentary particles of a metal carbide material which afford relatively sharp cutting surfaces or edges as contrasted with the dull or rounded particles of aluminum oxide or the irregular pointed particles of sand and like materials. For example, the cutting elements 23 may comprise fragmentary or fractured particles of tungsten carbide, silicon carbide, or boron carbide. To a certain extent, the selection of the particular carbide is dependent upon the service to which the cutting tool is applied and the relative toughness and hardness of the materials being processed by the tool. Tungsten carbide is substantially harder than silicon carbide and therefore is effective in cutting of somewhat harder materials. Boron carbide, on the other hand, is harder and tougher than either tungsten or silicon carbide, but is somewhat more difficult to handle in manufacture and may be slightly more expensive. In general, it may be stated that tungsten carbide affords excellent cutting elements and, in many applications, represents the best choice of cutting material.

The cutting elements 23 are securely bonded to the work surface 21 of the cutting disc 20 by an extremely thin film of brazing metal. As explained more fully hereinafter in connection with Figs. 7 and 8, the cutting elements are not embedded in a layer of the brazing metal; rather, the bond is effectively limited in its contact with the cutting elements to the projected undersurfaces thereof. More particularly, the film of brazing metal bonding the cutting elements 23 to the work surface 21 is restricted in effective thickness to substantially less than one half the average height of the cutting elements and preferably to less than ten percent of the average height of the cutting elements. Indeed, in the specific examples of the manufacturing method of the invention set forth hereinafter, the over-all average thickness of the brazing metal layer is approximately two to five percent of the average height of the cutting elements and, in the area intermediate the particles, may be virtually discontinuous. Preferably, the brazing metal comprises relatively pure copper, although silver alloys and other brazing metals may also be utilized.

The cutting elements 23 may be distributed in a random pattern upon the work surface 21 as illustrated by sector 24 of the cutting tool 20. On the other hand, a regular distribution pattern may be employed, as indicated by the sectors 25 and 26. It will be understood that, in most instances, the distribution pattern for the disc-type surface finishing tool 20 will be substantially uniform throughout the work surface 21 and that the different distribution arrangements illustrated by sectors 24, 25, and 26 are not employed on a single tool.

The cutting tool 20 is utilized in a conventional disc-type surface finishing device, commonly referred to as a disc type sander. The smoothness of the finished surface is determined primarily by the size of the cutting elements 23, which may vary substantially. For example, the cutting elements may be sized by conventional mesh screen methods and may range, for example, from coarse No. 16 mesh size to a fine No. 240 mesh. A given tool, of course, is preferably provided with cutting particles of substantially uniform size on any individual work surface thereof. In this connection, it should be noted that in finishing a surface to a given smoothness, the cutting elements 23 of the cutting tool 20 should be slightly smaller in size than the grits used in conventional abrading articles such as sandpaper, emery paper and the like.

Fig. 2 shows, in cross section, a disc-type cutting tool 30 which in many respects is substantially similar to the cutting tool 20 of Fig. 1 but which is adapted to carry out both sawing and surface-finishing operations. The tool 30 comprises a disc-shaped steel base member 31 having opposed planar work surfaces 32 and 33 and having an annular peripheral work surface 34. A multiplicity of minute cutting elements 35 are distributed in an open or widely spaced pattern upon the work surface 32 of the tool and are bonded thereto by a thin layer of brazing metal in essentially the same manner as described hereinabove in connection with Fig. 1. The opposed surface 33 is similarly provided with a multiplicity of cutting elements 36 which are brazed to the steel disc 31. Moreover, the peripheral surface 34 of the disc is provided with a layer of spaced cutting elements 37 brazed thereto in a relatively open distribution pattern. The cutting elements 35, 36 and 37, as in the previously-described embodiment, comprises fractured or fragmentary particles of metal carbide material each affording one or more relatively sharp cutting edges or surfaces and are distributed in a layer of single-element thickness upon the work surfaces 32, 33, and 34 respectively. Moreover, and also as in the first-described embodiment of the invention, the brazing metal which securely bonds the cutting elements to the steel disc is substantially thinner in effective thickness than one half the average height of the cutting elements, preferably being less than ten percent of the average cutting element height.

The size of the cutting elements 35–37 need not be uniform. Rather, in a given tool, the cutting elements 36 may be substantially smaller than the cutting elements 35 which, in turn, may be somewhat smaller than the edge-cutting elements 37. In this manner, the cutting tool 30 may be made extremely versatile in operation. When the disc 31 is rotated, as by means of a shaft 39, wood or other material to be finished may be brought into contact with the cutting elements 35 on the work surface 32 for a rough finishing operation. The same or another workpiece surface may be given a finer finish by means of the finer cutting-element array on the opposite work surface 33. Moreover, the tool may be employed as a rotary saw, utilizing the cutting elements 37 disposed about the rim 34 of the disc. In the use of the tool as a saw, the cutting elements 35 and 36 also afford a valuable service in that they finish the cut as it is made; that is, the tool simultaneously makes a cut and finishes the surface left by that cut. The tool is also very useful for dadoing and grooving.

Another important attribute of the combined saw and surface finishing tool 30 is its inherent safety with respect to the operator of a machine tool in which the disc is incorporated. If the machine operator accidentally brings a finger or other part of his body into contact with the cutting particles 37 on the rim 34 of the tool, only relatively minor injury results, since the tool tends to push the finger or the like away, cutting only the surface. The tool is therefore much safer, particularly in home use or in educational use, than the rotary steel saws conventionally used for cutting wood, plastics, leather, and the like.

The tools 20 and 30 of Figs. 1 and 2 have another attribute which is particularly important with respect to speed of operation. The metal-to-metal bond which secures the carbide fragments to the steel base member affords a highly conductive path for transmission of heat from the cutting elements to the base member. Consequently, the tool in each instance affords excellent heat dissipating characteristics, permitting much higher operational speeds than with previously known devices without burning the workpiece. This characteristic is important both in sawing operations and in surface finishing and markedly improves the efficiency of the tools.

Fig. 3 illustrates another tool 40 comprising a further embodiment of the invention. The tool 40 comprises a steel bar 41 having a plurality of work surfaces 42 and 43 upon which are distributed a multiplicity of minute cutting elements 44. The cutting elements 44 comprise fragmentary particles of metal carbide and are secured to the work surfaces of the tool by an extremely thin layer of brazing metal, preferably copper. The tool 40 is provided with a handle 45 and may be utilized in essentially the same manner as a conventional file. It should be noted, however, that the effective operating life of the tool 40 is substantially greater than a conventional serrated tool-steel file; moreover, the multiple cutting edges afforded by the cutting elements 43 are considerably more efficient in surface finishing than an ordinary file, particularly because they are non-directional.

Another file-like tool 50 is illustrated in Fig. 4. The tool 50 comprises a tapered cylindrical steel body 51 having an external work surface which supports a plurality of minute cutting elements 52 comprising fractured metal carbide particles. The particles are distributed in a layer of single-particle thickness and are brazed to the work surface of the tool by a layer brazing metal which is relatively thin in comparison with the average height of the cutting elements. The tool 50 may be provided with a handle 53 if desired and may be utilized in the finishing of curved surfaces and in like applications.

Another embodiment of the invention comprising a cutting tool 60 is illustrated in Fig. 5. The tool 60 comprises a resilient metal strip 61, preferably formed from relatively thin and resilient steel, which is shaped at the ends to permit the mounting thereof in a conventional vibration-type surface finishing device generally indicated by the dash outline 62. The under surface 63 of the steel band 61 is coated with a thin layer of brazing metal, preferably copper, which is utilized to secure a multiplicity of cutting elements 64 on the work surface of the tool. Cutting elements 64 constitute fractured particles of tungsten carbide, silicon carbide, boron carbide, or other metal carbides which can be wetted by the brazing metal. The brazing metal thickness is effectively restricted to substantially less than one half the average height of the cutting element 64 and preferably is made extremely thin in relation to that average height.

In this embodiment of the invention, and in all of the cutting tools of the invention, the individual cutting elements are relatively widely dispersed upon the work surface of the tool, preferably being restricted to a distribution factor as defined hereinabove of fifteen percent or less. Stated differently, the cutting elements, on the average, should be separated from each other by a distance of the order of twice their average diameter. This distribution is best illustrated in the enlarged view of Fig. 6, which may be considered to comprise a portion of the work surface of any of the tools shown in Figs. 1–5 and which shows a plurality of cutting elements 66 brazed to a work surface 67. The cutting element distribution pattern of Fig. 6 is a random one, with the spacing between individual elements varying substantially. Any of the tools, however, may be provided with a regularly-spaced cutting element pattern described hereinabove in connection with Fig. 1 without departing in any way from the inventive concept. In this connection, it should be noted that a regular distribution pattern for the cutting elements entails some additional expense in manufacture as compared with random distribution but does permit some saving in the quantity of cutting elements utilized. Thus, the particular pattern to be employed in fabricating a given tool depends primarily upon the relative expense involved, although in some instances the regular pattern may be justified on the ground that it affords slightly more efficient cutting action.

Figure 6 also affords an illustration of the shape of the cutting elements, each of which has a plurality of relatively sharp cutting edges. The concoidal surfaces afforded by the fractured carbide material afford a highly efficient cutting action, as described more fully hereinafter.

Fig. 7 is a greatly enlarged sectional view of a tool constructed in accordance with the invention and may be considered to represent a section taken through any of the embodiments of Figs. 1–5. As indicated therein, the cutting elements 70 are situated above the work surface 71 of a metal base member 72. The fractured carbide particles 70 are very securely bonded to the work surface 71 by a very thin film of brazing metal 73. Actually, in tools constructed in accordance with the inventive method as described hereinafter, the film 73 may be even thinner in relation to the average height of the cutting elements 70 than is shown in the drawing, and usually is about two to five percent as thick as the average height of the cutting elements. The brazing metal, in order to afford a bond of adequate strength, must wet the carbide particles, and therefore tends to make contact with a limited additional portion of the carbide particles other than the immediate base surface thereof as indicated by reference number 74. Nevertheless, the effective thickness of the metal, even where it contacts the cutting elements 70, is very much less than the overall height of the carbide particles and therefore does not noticeably mask or cover the cutting edges thereof. The metal film may even be effectively discontinuous in the spaces intermediate the cutting elements, as indicated by reference numeral 75.

The importance of the structure illustrated in Fig. 7 may readily be understood by comparison with Fig. 8, which shows a prior art cutting tool utilized for surface finishing, usually in connection with metal or other extremely hard materials. As illustrated therein, previous practice for tools of this nature has been to provide a steel base member 80 having a work surface 81 upon which a plurality of abrasive, cutting, or scoring particles 82 are supported. In this instance, however, the abrasive members 82 are secured on the work surface by a relatively thick layer of bonding metal 83 which masks all but the very tips of the grinding elements. Moreover, the distribution pattern of prior art devices of the kind illustrated in Fig. 8 is usually much less open than that employed in the invention. A tool of this kind is less efficient in operation and much more limited in effective operating life than a tool constructed in accordance with the invention and as illustrated in Fig. 7. Close spacing of the grinding or cutting elements 82 effectively limits their efficiency and in some instances may tend to cause jamming or filling up of wood material within the spaces between the particles. Of perhaps greater importance is the relative thickness of the bonding metal layer 83, which effectively obscures all but the very tips or points of the particles 82 and prevents their effective use in a cutting action or at least limits that action to a fractional portion of the life which might be achieved if the entire particle were exposed above the work surface 81.

The prior art arrangement illustrated in Fig. 8, in which the material-removing particles are effectively embedded in the metal layer 83 or even in the surface of the base member 80, does not afford a superior bond as compared with the embodiment of Fig. 7, which provides adequate adherence for the particles 70; indeed, in at least some instances, embedment of the abrasive particles may tend to transmit shock forces therebetween and may thus accelerate loosening and loss of the material-removing portions of the tool. The bond between the base member and the cutting elements in a tool constructed in accordance with the invention is in many instances stronger than the particles themselves, so that excessive stress in operation tends to fracture the carbide particles rather than disengage them from the tool base (Fig. 7). Consequently, the construction embodied in Fig. 7 affords substantially longer life than that of the prior art as illustrated in Fig. 8 and at the same time materially increases the operating efficiency of the tool.

Fig. 9 illustrates the relative efficiency and life characteristics of surface-finishing tools constructed in accordance with the invention in comparison with the garnet, aluminum oxide, and silicon carbide abrasive coatings utilized in the past. The data upon which Fig. 9 is based was compiled by comparison of disc-type surfacing devices such as the tool 20 of Fig. 1; all tested devices had abrasive or cutting particles of approximately equal size and all test work was done on oak at a peripheral speed of 4500 feet per minute and with a pressure of twenty-four pounds per square inch. In this figure, in which cutting rate is plotted as a function of total material cut, it is seen that the conventional aluminum oxide coating illustrated by curve 90, drops off rapidly in cutting rate with use; the end of effective tool life is indicated at point 91. A substantially similar curve 92 shows the effect of continued use upon the cutting efficiency of a conventional garnet-coated abrading disc. The end of effective life in this instance is indicated at point 93. Curve 94 affords the same information with respect to a conventional silicon carbide finishing disc, the end of effective life being indicated at point 95. Curve 96, on the other hand, is representative of cutting tools of the surface-finishing variety, such as tool 20, constructed in accordance with the invention. The end of the tool's effective life is indicated at point 97. As indicated by this curve, the initial efficiency of the tool 20 is very much higher than that of conventional disc sanders, affording about twice the initial cutting rate. By the same token, the cutting rate drops off very much less rapidly than that of the conventional discs, affording an effective increase in operating life of 100 to 500 times. Consequently, although tools constructed in accordance with the invention are higher in initial cost than the conventional devices, they are relatively inexpensive in use because of the greatly extended operating life. This is particularly true because in many instances the cost of operation of the tool is determined as much by the amount of time a machine must be stopped to permit replacement of the abrading or cutting elements as by the average life and cost of that cutting element.

Figs. 10–12 illustrate grinding, scoring, and cutting actions, respectively, as applied to surface finishing. In the arrangement schematically illustrated in Fig. 10, loose abrasive particles 100 are positioned between a pressure plate 101 and a member 102 having a rough surface 103 which is to be finished. The particles 100 are maintained in contact with the surface 103 by pressure from the member 101 and the two members 101 and 102 are moved relative to each other to afford a grinding action. The combined pressure and movement causes minute fracturing of the work piece 103 and chips are broken out of the surface 103 as indicated by dash line portion 104. The chips 104 are generally larger than the abrading particles 100.

The scoring action illustrated in Fig. 11 is accomplished by a relatively sharp grit or abrading element 110 moving across the roughened surface 111 of a surface 112 in pressure contact therewith. A relatively smooth surface may be afforded when the scoring elements 110 are closely packed, obscuring the line pattern which would otherwise result in the finished surface. This action is typical of sandpaper and other like abrading devices. If the abrading elements 110 are relatively rounded in configuration, as in the case of aluminum oxide abrasives, the abrasion action may tend to push portions of the material from the peaks into the valleys of the rough surface 111 as indicated by arrows 113 and tear off surface particles.

Fig. 12, on the other hand, shows a pair of cutting elements 120 each having at least one cutting edge or surface 121 which engages the relatively rough surface 122 of a work piece 123. The cutting surfaces 121, as they traverse the surface 122, tend to shear off the elevated portions of the work piece surface 122 as indicated by dash lines 124, rapidly smoothing the surface with a minimum loss of material and with maximum efficiency of operation. It is this action which is afforded by cutting tools constructed in accordance with the invention, which tend to cut away the work piece surface in a finishing operation rather than abrading or scouring that surface in the manner illustrated in Figs. 10 and 11, although some abrasive action also occurs. This difference in operation is considered to be a major factor, in many instances, in affording the greatly increased efficiency of tools constructed in accordance with the invention as compared with previously known devices.

The manufacturing technique employed in fabricating the cutting tools of the invention comprises another important aspect of the invention. The first important step of the manufacturing process is the application of an extremely thin coating of brazing metal to the work surface of a metal base member, usually a steel base member. This brazing metal may be applied in metallic form or, initially, in the form of a metal oxide. Preferably, it is applied as a comminuted metal or metal oxide dispersing in a volatilizable vehicle.

The next step in the manufacturing process is the distribution of the fragmentary particles of metal carbide upon the work surface of the tool. This may be accomplished in a number of ways. Perhaps the simplest method, and one which has proved satisfactory in all respects, at least for relatively small quantity production, is to sprinkle the carbide particles onto the work surface from a perforated container. A conventional salt shaker has been employed for this purpose. For volume production purposes, of course, somewhat more elaborate equipment may be utilized to distribute the cutting elements in a dispersed, single particle layer upon the work surface.

It is not essential that the brazing metal or metal oxide coating be applied to the work surface first; rather, the work surface may first be sprinkled with the carbide and subsequently coated with the suspension of metal or metal oxide. If this is to be done, a small quantity of tacky volatilizable material such as ethylene glycol is preferably applied to the work surface to form a thin film thereon before distribution of the cutting elements on the surface, in order to retain them in position on that surface. The suspension of metal or metal oxide powder serves this purpose if applied to the work surface before the carbide fragments.

After the brazing material and the cutting elements have been distributed upon the work surface of the tool base member, the tool is heated. As the temperature of the tool rises, the volatilizable vehicle in which the metal or metal oxide particles are suspended is progressively vaporized until all of the vehicle is driven off.

In order to prevent movement of the carbide particles with respect to the work surface after the vehicle has been vaporized and driven off, it is desirable that the vehicle have a relatively high vaporization temperature in order that the copper, copper oxide, or other brazing metal may be at a relatively high temperature before all of the vehicle has been dispersed. In this manner, it is possible to effectively initiate a sintering action in the brazing material which tends to form a sintered metal or metal oxide structure that retains the carbide particles in their desired position.

Continued heating of the tool brings the brazing metal to its fusion temperature. As the brazing metal reaches a liquid state, it wets the steel base and the carbide particles and forms an effective brazed bond therebetween which is extremely strong and, as indicated hereinabove, may be stronger than the particles themselves. Because the brazing metal wets the carbide particles, it may tend to accumulate to a slight extent in the areas immediately adjacent those particles. This action may be sufficient to thin out and even effectively void some portions of the work surface of the film of brazing metal. Excessive "lumping" or "puddling" of the brazing metal should be avoided, however, since it is not desirable to have large accumulations of metal encompassing the carbide cutting elements. For this reason, it is essential that the quantity of brazing metal applied to the tool be restrictied to prevent forming too thick a layer of brazing material on the work surface.

The heating operation which drives off the vehicle in which the brazing material is suspended and the subsequent continued heating which effects brazing of that metal to the steel base and the carbide fragments should be carried out in a non-oxidizing atmosphere. Indeed, if metallic copper is utilized, it is almost essential that a reducing atmosphere be employed and, in general, it is usually preferable to employ a reducing atmosphere for this portion of the fabrication process regardless of the choice of brazing material. Moreover, if metallic copper is employed as the starting material for the brazing operation, it is highly desirable that a flux be incorporated in the suspension; a relatively minor quantity of anhydrous borax may be incorporated in the brazing material suspension for this purpose.

The method employed to apply the suspension of copper, copper oxide, or other brazing metal to the work surface of the tool is not particularly critical. For example, in a commercial operation it has been found that this suspension may be conveniently and rapidly spray painted upon the work surface of the tool. On the other hand, the brazing material suspension may be applied by other conventional painting methods or may be silk screened onto the work surface. Moreover, a relatively wide range of suspension vehicles may be utilized, so long as certain criteria are observed. The suspension vehicle should be fully volatilizable or otherwise vaporizable upon application of heat, since it should be driven off completely from the tool before the brazing operation is completed. A vehicle which decomposes to vapor state constituents may be employed if desired. In addition, it is essential that no reaction occur between the brazing material and the suspension vehicle, or components thereof produced by heating, which would interfere in any way with the brazing action. Ethylene glycol and polyvinyl acetate are typical suitable vehicles.

Moreover, the percentage composition of the suspension is not especially critical. For example, satisfactory tools have been fabricated utilizing suspensions of approximately seventy percent copper oxide or metallic copper powder in thirty percent ethylene glycol, these percentages being by weight, and these percentages may be varied substantially, as to ratios of 80–20 and 60–40 brazing material to vehicle. Conventional formulations of this kind are available, including a suspension manufactured by the Glidden Company under the designation Cubond No. 172 and by Merchants Chemical Company under the trade designation Merco Braze No. 4020, both of which comprise a suspension of cuprous oxide powder in ethylene glycol. Of course, it may be necessary to thin these suspensions for spray coating or other application methods.

In heating, a multiple zone brazing furnace may be utilized to substantial advantage, particularly in high volume production. For example, in a copper brazing process the coated tool may first be raised in temperature in a pre-heating zone maintained at a temperature of 400 to 1900° F., after which the temperature exceeds 2000° F. Thereafter, cooling may be accomplished in a cooling zone in the furnace held at a substantially lower temperature, such as 200° F.

It is also possible to apply the brazing metal to the carbide particles before the particles are distributed upon the work surface of the tool. For this purpose, the metal carbide cutting elements are thoroughly mixed or otherwise coated with comminuted copper or copper oxide and a suitable volatilizable vehicle such as ethylene glycol, after which the resulting mixture, usually of paste-like consistency, is dried. The coated particles may then be sprinkled upon or otherwise applied, preferably in powder form, to the work surface of a tool base member, after which the tool is heated to braze the particles to the work surface as described hereinabove. In the course of the brazing operation, most of the brazing metal tends to liquify and run off from the carbide particles, resulting in a finished product which is essentially similar to that fabricated in accordance with the previously described technique. An extremely thin film of copper may remain on the exposed surfaces of the particles, but is worn away on the first use of the tool. In this pre-coated particle process, it may be desirable to coat the work surface of the tool base member with a tacky volatilizable coating to retain the particles in position during the course of the brazing operation. As before, a composition selected for this purpose should be one which is removed completely during the heating portions of the manufacturing procedure.

Hence, while we have illustrated and described the preferred embodiments of our invention, it is to be understood that these are capable of variation and modification.

We claim:

1. A cutting tool comprising a metal base member having a work surface of predetermined configuration and a multiplicity of cutting elements, comprising fragmentary particles of a cutting material selected from the group consisting of diamond and metal carbides and each affording relatively sharp cutting surfaces, distributed in a layer of single particle thickness upon said work surface, said cutting elements being brazed to said work surface by a layer of brazing metal having a maximum effective thickness less than about ten percent of the average height of said cutting elements.

2. A cutting tool comprising a metal base member having a work surface of predetermined configuration and a multiplicity of cutting elements, comprising fragmentary particles of a cutting material selected from the group consisting of diamond and metal carbides and each affording relatively sharp cutting surfaces, distributed in a layer of single particle thickness upon said work surface with a distribution factor of less than twenty percent, said cutting elements being brazed to said work surface by a layer of brazing metal having a maximum effective thickness less than about ten percent of the average height of said cutting elements.

3. A cutting tool comprising a metal base member having a work surface of predetermined configuration and a multiplicity of cutting elements, comprising fragmentary particles of tungsten carbide and each affording relatively sharp cutting surfaces, distributed in a layer of single particle thickness upon said work surface with a distribution factor of less than twenty percent, said cutting elements being brazed to said work surface by a layer of copper having a maximum effective thickness less than about ten percent of the average height of said cutting elements.

4. A cutting tool comprising a steel base member having a work surface of predetermined configuration and a multiplicity of cutting elements, comprising fragmentary particles of a cutting material selected from the group consisting of silicon, tungsten, and boron carbides and each affording relatively sharp cutting surfaces, distributed in a layer of single particle thickness upon said work surface, said cutting elements being brazed to said work surface by a layer of brazing metal selected from the group consisting of copper and silver alloys and having a maximum effective thickness less than about ten percent of the average height of said cutting elements.

5. A surface-finishing and sawing cutting tool comprising a disc-shaped base member having a planar work surface and an annular work surface and a multiplicity of cutting elements, comprising fragmentary particles of a cutting material selected from the group consisting of tungsten, silicon, and boron carbide and each affording relatively sharp cutting surfaces, distributed in a layer of single particle thickness upon each of said work surfaces, said cutting elements being brazed to each of said work surfaces by a layer of brazing metal having a maximum effective thickness less than about ten percent of the average height of said cutting elements.

6. A cutting tool comprising a metal base member having a work surface of predetermined configuration, a multiplicity of cutting elements, comprising fragmentary particles of a metal carbide cutting material and each affording at least one relatively sharp cutting surface, and a layer of metal brazed to said cutting elements and to said base member to secure said elements upon said work surface in a single-particle layer, said brazing metal being effectively limited in contact with said cutting elements to the projected under surface of said elements.

7. A cutting tool comprising a metal base member having a work surface of predetermined configuration, a multiplicity of cutting elements, comprising fragmentary particles of a cutting material selected from the group consisting of tungsten, silicon, and boron carbides and each affording relatively sharp cutting surfaces, and a layer of bonding metal brazed to said cutting elements and to said base member to secure said elements upon said work surface in a single-particle layer having a distribution factor of less than fifteen percent, said brazing metal being effectively limited in contact with said cutting elements to the projected under surface of said element.

8. A cutting tool comprising a steel base member having a work surface of predetermined configuration, a multiplicity of cutting elements, comprising fragmentary particles of tungsten carbide and each affording relatively sharp cutting surfaces, and a layer of copper brazed to said cutting elements and to said base member to secure said elements upon said work surface in a single-particle layer having a distribution factor of less than fifteen percent, said brazing metal being effectively limited in contact with said cutting elements to the projected under surface of said element.

9. A cutting tool of the class described comprising a metal base member having a work surface with a multiplicity of discrete metal carbide cutting elements brazed thereto, said cutting elements being distributed over said work surface in a single layer and generally separated from each other in an open distribution pattern, said cutting elements being brazed to said work surface by an amount of brazing metal sufficient to provide bonds between the bottom supporting surfaces of said cutting elements and said work surface but insufficient to provide a thickness layer of brazing metal over said work surface exceeding in average thickness about ten percent of the average height of said cutting elements.

10. A cutting tool of the class described comprising a steel base member having a work surface with a multiplicity of discrete tungsten carbide particles brazed thereto, said particles being distributed over said work surface in a single layer and generally separated from each other in open distribution pattern so as to cover not more than about twenty percent of said work surface, said particles being brazed to said work surface by an amount of copper brazing metal sufficient to provide bonds between the bottom supporting surfaces of said particles and said work surface and insufficient to provide a thickness layer of brazing metal over said work surface exceeding in average thickness about ten percent of the average height of said particles.

11. A cutting tool of the class described comprising a metal base member having a work surface with a multiplicity of discrete metal carbide cutting elements brazed thereto, said cutting elements being distributed over said work surface in a single layer and generally separated from each other in an open distribution pattern, said cutting elements being brazed to said work surface by an amount of brazing metal sufficient to wet the bottom portions of said cutting elements and provide bonding layers between the bottom surfaces thereof and said work surface but insufficient to provide a continuous layer of brazing metal of appreciable thickness in the open spaces surrounding said elements.

References Cited in the file of this patent

UNITED STATES PATENTS

| | | |
|---|---|---|
| 1,960,055 | Kelley | May 22, 1934 |
| 2,082,150 | Coffman | June 1, 1937 |
| 2,347,920 | Mays | May 2, 1944 |
| 2,411,867 | Brenner | Dec. 3, 1946 |
| 2,562,587 | Swearingen | June 31, 1951 |
| 2,606,132 | Klinker | Aug. 5, 1952 |
| 2,833,638 | Owen | May 6, 1958 |